US012314894B2

(12) United States Patent
Schnitzer

(10) Patent No.: US 12,314,894 B2
(45) Date of Patent: May 27, 2025

(54) SYSTEM AND METHOD FOR TRACKING OF REUSABLE ITEM

(71) Applicant: Reuzzi LLC

(72) Inventor: Cheryl Schnitzer, Easton, MA (US)

(73) Assignee: Reuzzi LLC, Sharon, MA (US)

( * ) Notice: Subject to any disclaimer, the term of this patent is extended or adjusted under 35 U.S.C. 154(b) by 0 days.

(21) Appl. No.: 18/109,847

(22) Filed: Feb. 14, 2023

(65) Prior Publication Data

US 2023/0289715 A1  Sep. 14, 2023

Related U.S. Application Data

(60) Provisional application No. 63/310,576, filed on Feb. 16, 2022.

(51) Int. Cl.
G06Q 10/0837 (2023.01)
G06Q 30/0226 (2023.01)
G06Q 30/0235 (2023.01)
G06K 19/06 (2006.01)

(52) U.S. Cl.
CPC ..... *G06Q 10/0837* (2013.01); *G06Q 30/0226* (2013.01); *G06Q 30/0235* (2013.01); *G06K 19/06037* (2013.01)

(58) Field of Classification Search
CPC .......... G06Q 10/0837; G06Q 30/0226; G06Q 30/0235
See application file for complete search history.

(56) References Cited

U.S. PATENT DOCUMENTS

| | | | | |
|---|---|---|---|---|
| 2012/0066156 A1* | 3/2012 | Pryor | .................... | G06Q 20/20 705/500 |
| 2015/0186841 A1* | 7/2015 | Sar | ....................... | G06Q 30/016 705/304 |
| 2017/0124643 A1* | 5/2017 | Haimi | .............. | G06K 19/06009 |
| 2019/0251522 A1* | 8/2019 | Wallis | ................ | G06Q 30/0633 |
| 2020/0342487 A1* | 10/2020 | Greenberger | ........ | B65D 25/205 |
| 2021/0081909 A1* | 3/2021 | Wittek | ............... | G06K 7/10297 |

(Continued)

FOREIGN PATENT DOCUMENTS

WO    WO-2022187748 A2 *  9/2022

OTHER PUBLICATIONS

Return-it pilot provides solution for reusable cups and recycles single-use cups. (May 11, 2022). Canada NewsWire (Year: 2022).*

(Continued)

*Primary Examiner* — Matthew L Hamilton
(74) *Attorney, Agent, or Firm* — Sofer & Haroun, LLP

(57) ABSTRACT

The present arrangement provides for a method for monitoring the use of reusable containers. Among other features, the present arrangement includes a feature where, after a reusable container is returned to circulation, a communication is received from a mobile device of a second user indicating that the second user has checked out the reusable container after they scan the unique codes applied to the reusable container. A customer account database is updated with an information relating to the third communication, indicating that the reusable container with applied unique code is checked out to the second user, and also converting a provisional return status of a first user for the reusable container to a confirmed return status.

10 Claims, 16 Drawing Sheets

Account master database 300

| QR 302 | item 304 | Date attached 306 | replacement date 308 | userID 310 | checked out 312 | return deadline 314 | provisional return 316 | verified return 318 | NOTES |
|---|---|---|---|---|---|---|---|---|---|
| #1001 | PP (large Food) | 1/1/23 | 1/1/25 | user #ABC | 2/1/23 8:59AM | 2/3/23 8:59AM | 2/2/23 (12:46PM) Location QR #123... | 2/5/23 (1:15PM) | |
| #1002 | PP (small Food) | 1/1/23 | 1/1/25 | user #DEF | 2/1/23 9:15Am | 2/3/23 9:15AM | 2/6/23 (9:50PM) Location QR #123 | 2/8/23 (1:45AM) | |
| #1003 | (cup) | 1/1/23 | 1/25 | user #GHI | 2/1/23 10:10AM | 2/3/23 10:10AM | PENDING | | |
| #1004 | ... | .... | .... | .... | .... | ..... | .... | .... | ... |
| #1005 | .... | .... | ... | .. | ..... | ... | .... | ... | |

(56) References Cited

U.S. PATENT DOCUMENTS

2022/0139146 A1* 5/2022 Wallis .................... G07F 7/069
  194/205
2024/0086825 A1* 3/2024 Misak ................ G06Q 10/0833

OTHER PUBLICATIONS

Reusable take-out food containers can reduce plastic waste, emissions, costs, U-M study finds. (Jan. 19, 2023). Targeted News Service (Year: 2023).*

Dickinson, G. (Apr. 26, 2021). Tiffin's reusable takeout container program is philly's first. here's how it works. TCA Regional News (Year: 2021).*

* cited by examiner

| Account master database 300 | | | | | | | | | |
|---|---|---|---|---|---|---|---|---|---|
| QR 302 | Item 304 | Date attached 306 | replacement date 308 | userID 310 | checked out 312 | return deadline 314 | provisional return 316 | verified return 318 | NOTES |
| #1001 | PP (large Food) | 1/1/23 | 1/1/25 | user #ABC | 2/1/23 8:59AM | 2/3/23 8:59AM | 2/2/23 (12:46PM) Location QR #123... | 2/5/23 (1:15PM) | |
| #1002 | PP (small Food) | 1/1/23 | 1/1/25 | user #DEF | 2/1/23 9:15Am | 2/3/23 9:15AM | 2/6/23 (9:50PM) Location QR #123 | 2/8/23 (1:45AM) | |
| #1003 | (cup) | 1/1/23 | 1/25 | user #GHI | 2/1/23 10:10AM | 2/3/23 10:10AM | PENDING | | |
| #1004 | ... | ... | ... | ... | ... | ... | ... | ... | ... |
| #1005 | ... | ... | ... | ... | ... | ... | ... | ... | |

Figure 4

| Reward Database 800 | | | | | | |
|---|---|---|---|---|---|---|
| User ID 802 | Total uses 804 | total outstanding 806 | Provisional returns 808 | Verified returns 810 | Reward points 812 | Redeemed rewards 814 |
| #1001 | 54 | 4 | 50 | 46 | 250 | (4) rewards (800 points) |
| #1002 | 32 | 2 | 30 | 27 | 175 | (2) rewards (600 points) |
| #1003 | 66 | 6 | 60 | 55 | 600 | (5) rewards (1000 points) |
| #1004 | ... | .... | .... | .... | .... | .... |
| #1005 | .... | .... | .... | ... | ..... | .... |
| | | | | | | |

Statistics

Home / Dashboard / Statistics

| Number of Users | 426 |
|---|---|
| Number of Containers | 3229 |
| Number of Containers Checked Out | 68 |
| Number of Containers Pending Return | 286 |
| Number of Containers Verified Return | 12 |
| Number of Containers Damaged | 0 |
| Number of Containers Lost | 9 |
| Money Saved | $1682.50 |
| CO2 Emissions avoided | 798.21 kg |

Figure 16

SYSTEM AND METHOD FOR TRACKING OF REUSABLE ITEM

RELATED APPLICATION

This application claims the benefit of priority to U.S. Provisional Patent Application No. 63/310,576, filed on Feb. 15, 2022, the entirety of which is incorporated by reference.

FIELD OF THE INVENTION

The present arrangement is in the field of reusable items. More particularly, the present arrangement is in the field of a system and method for tracking the location and use of reusable items.

DESCRIPTION OF RELATED ART

In the field of food service items, such as individual portion food service containers, the use of disposable or single use items, whether recyclable or not, can create a large amount of waste. There is a desire on the part of food service providers and/or their customers to provide a greener alternative. One such alternative is the use of reusable or washable food containers. With the use of reusable containers, the amount of waste is greatly reduced. For example, the present inventor has found that when given a financial incentive to use a reusable food container versus a single use container, a 90% or more reduction in the use of single use containers can be obtained.

However, one problem with reusable containers is that they cost more to produce, both environmentally and financially, and must be returned by the users/consumers in order for such a system to work. One issue that can arise, particularly with a large-scale implementation (e.g., school cafeteria), is that even though the containers are reusable, many users simply do not return them for cleaning and reuse. Without proper tracking the return of reusable containers can fall below 66%. This greatly increases the cost of tracking down the containers, increasing replacement costs, and otherwise defeats the purpose of avoiding waste. For example, to control misuse many prior art systems for managing reusable food consumption containers/trays, generally require a central monitor or person to actively track the whereabouts of outstanding containers, and various collection efforts.

Objects and Summary:

The present arrangement overcomes the drawbacks associated with the prior art and provides a system and method for tracking the obtaining, use, and return of reusable food containers. Such a system employs QR codes, or the like, placed on reusable trays/containers as well as an accompanying user application that is used to track the use of and return of each of the coded trays by a plurality of users. This system does not require any tracking or monitoring by the food service provider as all of the tracking and management obligations are placed on the end users and thus the present system greatly reduces the overhead associated with a reusable container program.

Such a system and method, as described in more detail below, may provide the following advantages over prior art arrangements:

Track a unique QR code on each container, with no special requirements on the type of container;
Automatically reminds users to return their containers via a mobile application and email;
Provide a running tally of how much money the user would owe if the container (with QR code label) is not returned, damaged, or lost;
Identifies drop-off locations for dirty containers;
Rewards good behavior with free food items in the cafeteria/food location, sponsor planting a tree, etc.;
Gamify the reusable tray process with points and reward badges (e.g. "Climate Champ" badge) with additional options for rewards;
Reward more points for quick returns (e.g., 15 points within 48 hours, and 5 points after 48 hours);
Simplifies the institution of charges for unreturned containers to offset replacement costs;
Stresses shifts in personal behavior that can result in benefits to the reduce/reuse/green community; and
Provides reports on measured reduced environmental impact for institutions and businesses employing the present system and method.

To this end the present arrangement provides for a method for monitoring the use of reusable containers. The method includes generating a customer account and providing a plurality of unique codes, each for application on a reusable container and generating at least one second location code for the customer to be applied to a return location for the reusable containers. A mobile application is provided to a plurality of users of the reusable containers, the mobile application for use on a mobile device of the user. A first communication is received from the mobile device of a first one of the users indicating that the user has checked out a first reusable container after they scan one of the unique codes applied to the first reusable container.

The method includes updating a customer account database with a first information relating to the first communication, indicating that the first reusable container with applied unique code is checked out to the first user and receiving a second communication from the mobile device of the first user including information that the first user scanned the unique code of the first reusable container and that the first user scanned the at least one return code, indicating that the first reusable container has been returned to the return location.

A customer account database is updated with a second information relating to the second communication, indicating that the first reusable container with applied unique code has been returned to the return location, the second information constituting a provisional return status to the first user for the first reusable container.

After the reusable container is returned to circulation, a third communication is received from the mobile device of a second one of the users indicating that the second user has checked out the first reusable container after they scan the unique codes applied to the first reusable container. A customer account database is updated with a third information relating to the third communication, indicating that the first reusable container with applied unique code is checked out to the second user, and also converting the provisional return status of the first user for the first reusable container to a confirmed return status.

BRIEF DESCRIPTION OF THE DRAWINGS

The present invention can be best understood through the following description and accompanying drawing, wherein:

FIG. 4 illustrates an account master database, in accordance with one embodiment;

FIG. 10 illustrates a reward database, in accordance with one embodiment;

FIG. 14 is a screenshot taken from an administrator application connected with the master account database of FIG. 3, in accordance with one embodiment;

FIG. 16 is a screenshot of an environmental impact accounting page taken from an administrator application, in accordance with one embodiment.

DETAILED DESCRIPTION

In one embodiment, to implement the present system and method, a customer in the form of a school cafeteria, restaurant, and/or food service provider contacts the present system to open an account. For the purposes of illustration, the present embodiments and examples are described in the form of a school cafeteria using reusable plastic containers for the purposes of illustrating the salient features. However, it is understood that this is exemplary only, and the present system and method may be used by anyone tracking the use, return, and reuse of reusable service items.

Figure 1:
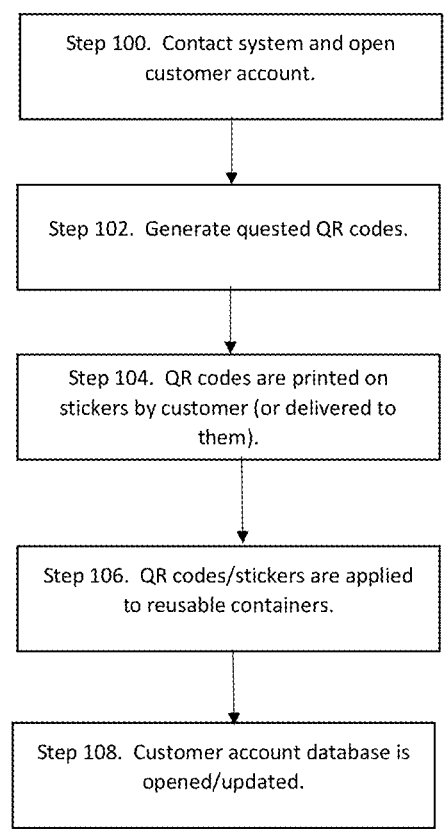
FIG. 1 is a flow chart illustrating the steps for a customer setting up an account and labeling containers, in accordance with one embodiment.

As illustrated in the flow chart FIG. 1, at step 100, the customer (i.e. food service provider) approaches the present system and requests to open account. It is understood that the present system and method are to be implemented in the form of a web accessible service, maintaining typical web-based services architecture including normal requisite servers and connectivity and data storage servers supporting the various features discussed in more detail below.

Returning to FIG. 1, for example, a customer desiring to use the present system and method, may have a thousand (1000) large reusable food storage containers, a thousand (1000) small reusable food storage contains and a thousand (1000) reusable beverage containers that they want to track the use, return and reuse thereof. As such, they would request an account for three thousand (3000) unique QR codes, plus the additional of QR codes needed at return locations, e.g., two (2). At step 102, the system would provide the customer with an account (e.g., on-line/web accessible account described in more detail below) and provide them with a series of three thousand and two (3002) unique QR codes. At step 104, such QR codes are printed, either by the present system described below, by a third-party provider, or by the customer onto individual stickers or labels that are both capable of being attached to the reusable containers of the customer, as well as being stable enough to undergo repeated washings. As an example, if the reusable containers of the customer are made of reusable grade polypropylene then the stickers for the QR codes would have to a have a permanent glue that is compatible with that polymer and the stickers should support, for example, two hundred plus (200+) washes. As noted above, the present arrangement although being described in the context of reusable food containers, it is compatible for use with any type or material of reusable item(s), the sticker application being done in a manner compatible therewith.

Figure 2:
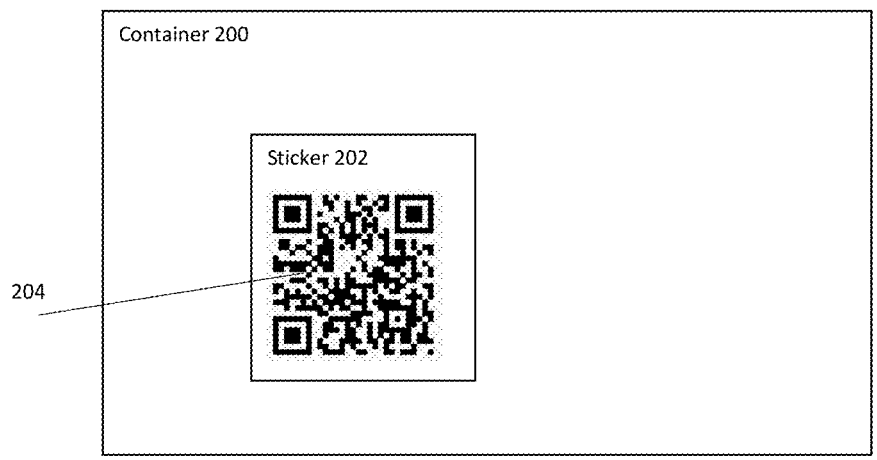
FIG. 2 illustrates an exemplary reusable container with unique QR code thereon, in accordance with one embodiment.

At step 106, once the stickers are printed, they are placed on the various reusable containers owned by the customer. FIG. 2 shows an exemplary reusable food storage container 200, with a sticker 202 placed thereon, sticker 202 having a unique QR code 204 thereon. This process of step 106 is repeated for as many containers 200 and stickers/QR codes 202/204 until they are all applied.

In step 108 the customer may set up a master account database 300 for supporting the tracking of container 200. Master account database 300 is stored on the servers of the present system and is accessible to the customer through customary web accessibility features. It is further contemplated that a customer may be provided with a mobile support application, i.e., for an administrator to have mobile access avenues to master account database 300 that is described in more detail below. For example, such a customer administrator mobile app may allow an administrator to express checkout a container 200 or check on certain administrative details about container 200.

Figure 3:
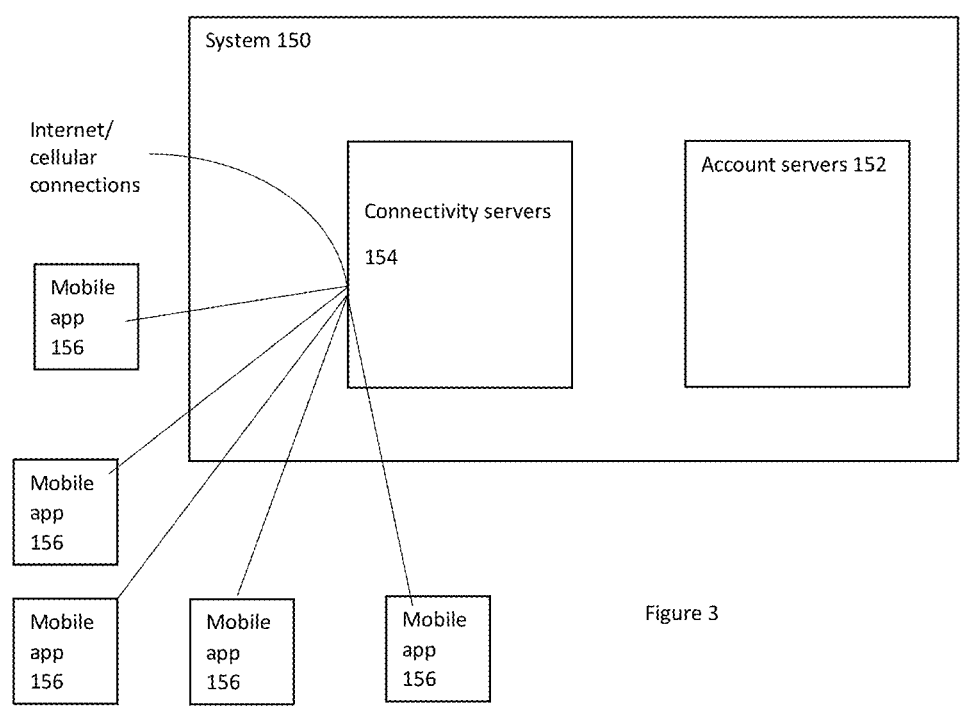
FIG. 3 shows an exemplary high level system diagram in accordance with one embodiment.
Figure 5:
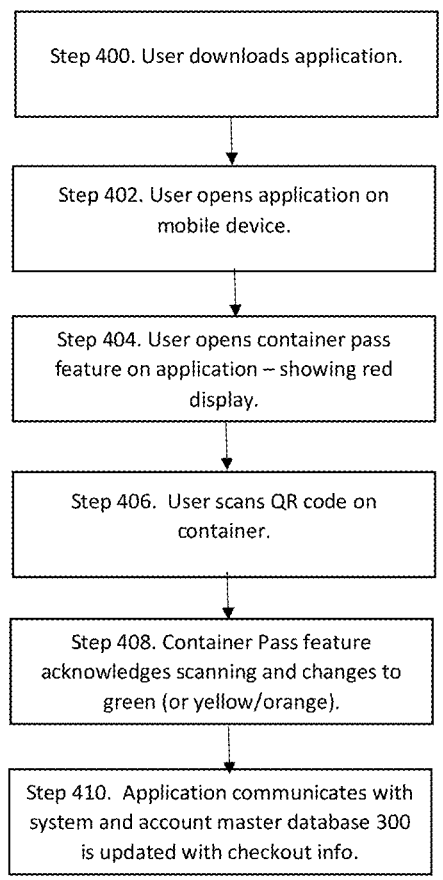
FIG. 5 is a flow chart illustrating the steps for a user checking out a reusable container, in accordance with one embodiment.

FIG. 3 is presented by way of example to show a high-level system diagram supporting the salient features of the invention. As shown in FIG. 3, a system 150 is located with primary servers 152 for supporting the various account master databases 300 of the different customers, the details of master account database 300 described in more detail below. System 150 may also have internet accessible servers 154 for communication with a plurality of user mobile applications 156, for example on the mobile devices of the users. In this manner, with mobile applications 156 and system servers 152 supporting master account databases 300, it is understood that they are in constant connection with one another, to support updating of the required fields of account master database and updating of features of mobile application 156. It is contemplated that features explained above in FIGS. 1-2 and below in FIGS. 4-13 may be implemented on such exemplary system 150.

Turning to the details of master account database 300, FIG. 4 shows a master account database 300 where the customer, after completing step 106 (or during/partially during step 106) may fill in certain data fields to set the granularity of the tracking data. Master account database 300 has a QR code field 302 for maintaining a code or notation for each unique QR code 204 associated with the customer account. A product description field 304 can contain a brief description of the reusable container (e.g., large reusable 20 oz polypropylene container from XYZ corp). An attachment date field 306 and replacement tracker field 308 may include the date sticker QR code 202/204 was applied to container 200 as well as a possible date for replacement based on normal use cycles for the type of container 200. For example, if the date in field 306 is Jan. 1, 2023 and the product contained in product description field 304 is reusable polypropylene (e.g., good for about 150-250 wash cycles), then proposed replacement date in field 308 may list Jan. 1, 2025 estimating a possible two-year replacement time frame. These fields 306 and 308 are only for information purposes and not required for the function of the system. As shown in FIG. 4, there are additional fields that are explained in more detail below, but at this stage, account master database 300 is sufficiently populated to begin operations.

As such, once the account is set up as detailed above, the customer can simply place reusable containers 200 with stickers/QR codes 202/204 thereon into circulation, for example in their school cafeteria for use by users (e.g., purchasers of food). So it is clear, as noted above the "customer" refers to the account holder (i.e. food service vendor) and the "user" refers to the person purchasing food in reusable container 200.

Moving forward, the following describes the use of the present system and method from the standpoint of the user. At step 400, as shown in flow chart FIG. 5, the user downloads a mobile application from an application store, for use on their mobile phone/device. It is understood that the mobile application is typically accessible through normal mobile application downloading platforms and is configured to enable the following described features, and to communicate with the servers of the present system.

Once downloaded, at step 402, the user opens an account with the system which may require only their name, cell phone number, and email address. Other demographic information (age, home address, school, etc.) may be requested but are not necessarily required.

Figure 6:
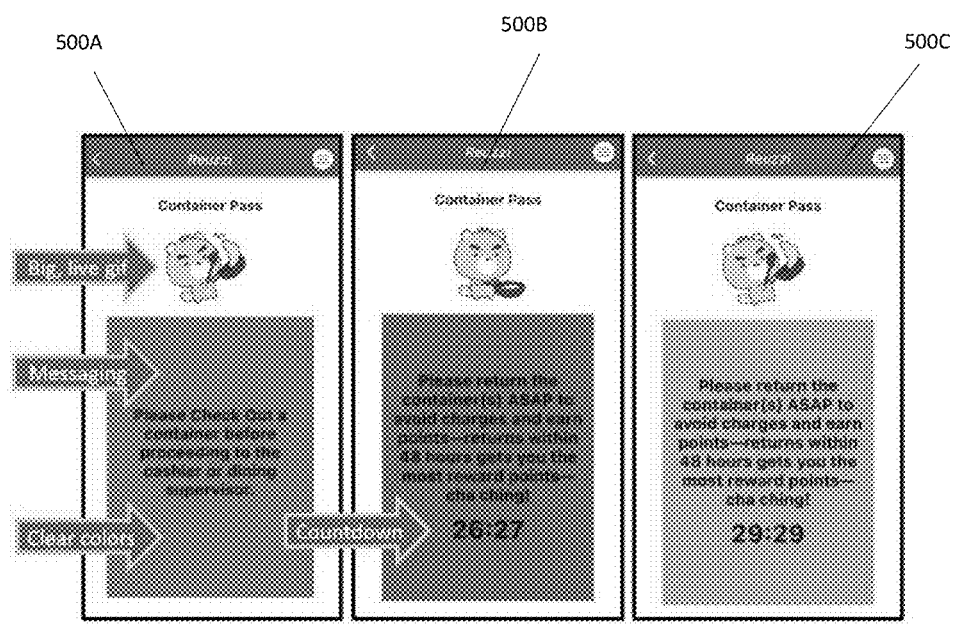
FIG. 6 shows screenshots taken from a container pass feature of the user application, in accordance with one embodiment.

When a user enters a food service area of the customer that has container 200 in circulation, the user is presented possibly with an option to buy food from a reusable container 200. It is contemplated that, in some cases, the purchase of food in reusable container 200 may result in price discounts to the user. When a user obtains the food item in container 200, they open their app and proceed to the normal checkout to pay for the food. At this point (or just before) at step 404 the user opens a check out feature of "container pass" on their mobile application. For example, this action automatically opens a container pass screen 500A as shown in FIG. 6. This screen 500A alerts both the user and the checkout cashier or dining supervisor that QR code 204 has not yet been scanned by the user (i.e, it's not checked out by that user). Container pass screen 500A, relating to pre-checkout) may be color coded red, include a moving GIF to show the app is "live" (and not a screenshot), and a message e.g., "Please check out container."

At step 406, the user uses their smart device with the application open, to scan QR code 204 on container 200 to indicate that they are checking out a particular container 200. With any action with QR code 204 (e.g., check out and return), the user would be automatically associated with that organization, and appear in that organization's database (account master database 300 for that customer). Then, at step 408, the container pass screen moves to an acknowledged state 500B as shown in FIG. 6 so the checkout cashier may approve the removal of the container from the cafeteria. This may change the screen color green and also provide a reminder to the user to return container 200 within a certain time period. A countdown clock may optionally be added to screen 500B that would be a timer for how long after scanning QR code 204 the user has to checkout with the cashier after scanning (e.g. 30 minutes, until the container pass feature resets). It is understood that the user's mobile application is connected (actively when on-line and passively until the user's mobile app reconnects to the internet) on the backend to the customer's account master database 300. As such, the data and features that are reflected both on the user's application and the customer's account, for example the check-out of the container, are synchronized with one another.

This green screen 500B and confirmation of scanning can be shown to the check-out cashier to show that reusable container 200 is in fact properly checked out and thus the user is entitled to take it, and possibly entitled to a reduced price (incentive to use reusable container 200 instead of single use containers). Although not shown on FIG. 6 at screen 500B, a copy of QR code 204 may be displayed for co-scanning by the cashier to confirm/check against QR code 204 on container 200 if that level of security is desired by the customer/food vendor. Separately, it is noted that if the user has one or more unreturned containers 200 then instead of green container pass screen 500B, the user (and cashier) may see an orange/yellow caution container pass screen 500C, which may be functionally identical to green container pass screen 500B, but is tinted orange/yellow to remind and alert the user that they have unreturned container 200.

At step 410, as soon as the user scans QR code 204 account master database 300 (FIG. 4) is updated to populate additional fields including for example userID field 310 and time and date field 312. For example, if a user were to check out container 200, then the name (and/or account number) of the user making the checkout according to the above process would appear in userID field 310 and time/date of checkout would appear in time and date field 312 so that the customer or their administrator would know that a particular container 200 is checked out, to whom, and when. A related return deadline field 314 would automatically be populated with countdown timer for the return deadline as set by the customer (e.g. 48 hour countdown). It is noted that this return deadline field 314 is not necessarily a strict deadline that would trigger penalties, but rather just a tracker for supporting additional features such as speedy return rewards points, as discussed in more detail below.

Figure 7:
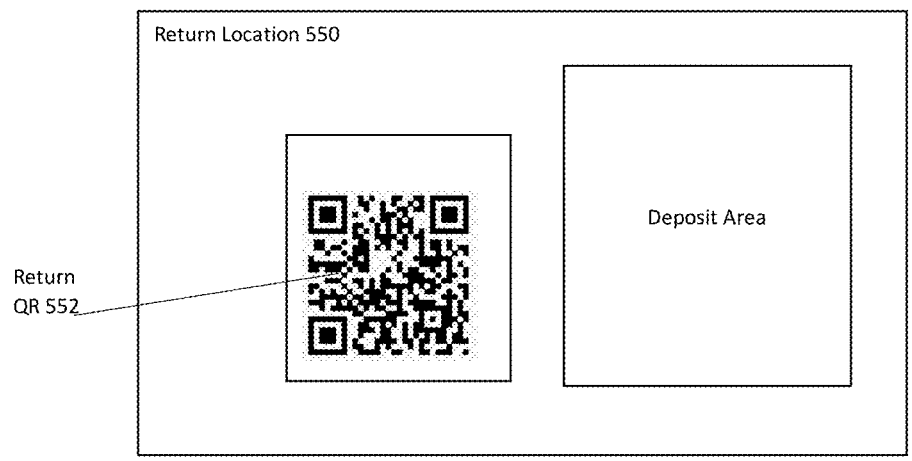
FIG. 7 illustrates a container return location, in accordance with one embodiment.
Figure 15:
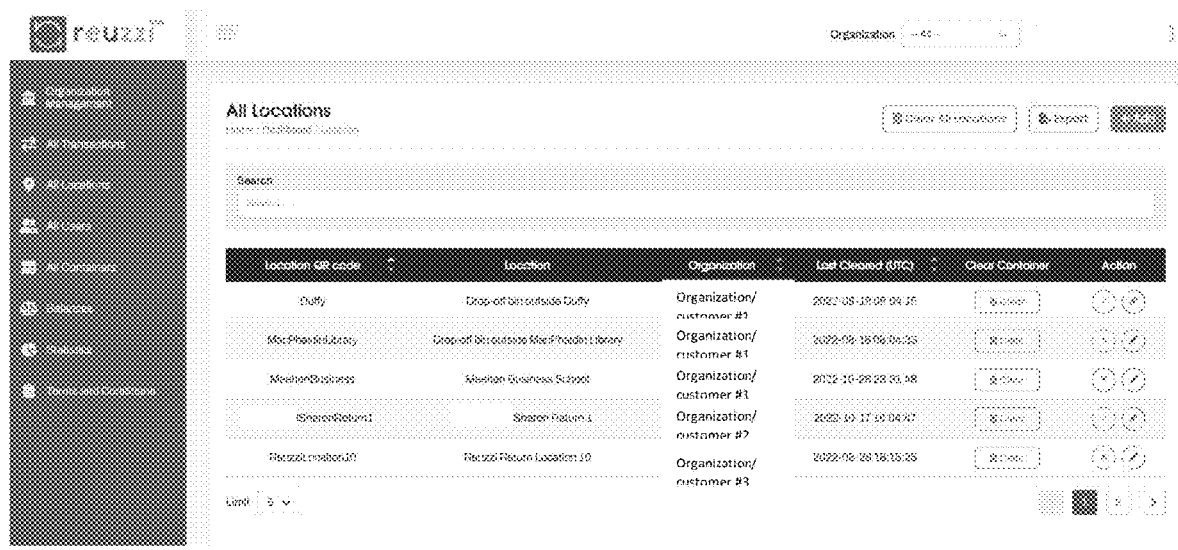
FIG. 15 is a screenshot taken from an administrator application connected showing return location management features, in accordance with one embodiment.

Turning to the return process, as shown in FIG. 7, a return location 550 is shown having a return location QR code 552. Return location is simply a drop off location for used container 200. A return QR code 552 is a separate type of QR code that is used to identify locations so that the customer can know what locations are being used for drop-offs. Return QR code(s) 552 would typically be provided to the customer when they set up the account. It is contemplated, that the user, after checking out a container 200 from a particular customer, may have access in their application of a display of return locations for that user, for example including periodic updates if return locations for that customer move. Other features that may be supported, possibly by additional fields in account master database, a facility manager may access the website and look at the number of containers 200 in each return location 550 to know when the drop-off bin is full and containers 200 need to be transported for cleaning. As shown in FIG. 15 which is a screenshot available to a customer account administrator, an account facilities manager could "Clear" the return location 550 on the web and could "Clear All Locations" at once. Customers could add or delete drop-off locations 550 on the web as needed.

Figure 8:
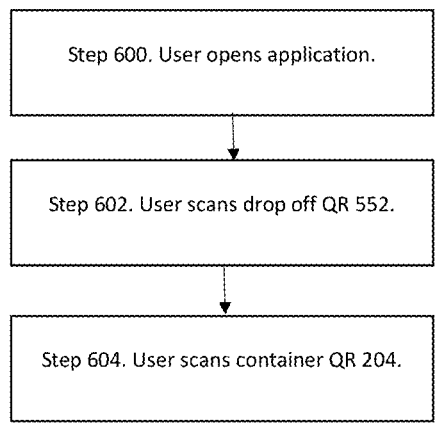
FIG. 8 is a flow chart illustrating the steps a user takes to return a reusable container, in accordance with one embodiment.

The return process is shown in flow chart FIG. 8. At step 600 the user with their used container 200 first opens their application. At step 602 the user scans return QR code 552 at a return or drop-off location 550 which may be displayed on a fixed sticker or printout. Next at step 604, the user scans QR code 204 on container 200. This provisionally completes the return process with the user's application notifying the system of the return and populating a provisional return field 316 on account master database 300 including the time and date of the return, QR code 204 that was returned and location/return QR code 552 where container 200 was physically deposited.

As noted above, the return process described in FIG. 8 only acts to provisionally consider container 200 returned. As there are opportunities for fraud in this return process, container 200 is not considered confirmed returned until container 200 is checked out again by another user (i.e., as per the checkout process in FIG. 5).

Figure 9:
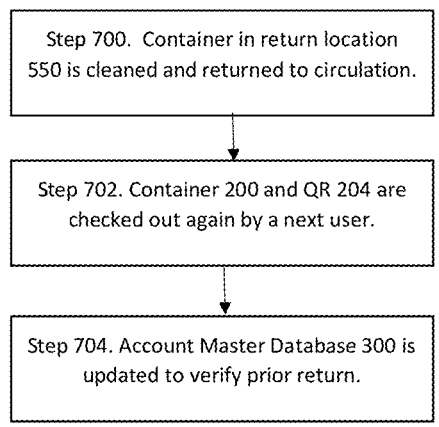
FIG. 9 is a flowchart of the verification process, verifying the return of a prior returned container, in accordance with one embodiment.

As shown in FIG. 9, after container 200 is returned to return location 550, the customer/food service provider washes container 200 and returns it to circulation/reuse at step 700. Next at step 702, another user checks out container 200 as per the above-described process in FIG. 5. This completes the prior return process and changes the provisional return to a completed return. At step 704 a notation may be made to a verified return field 318 on customer master database 300 which may include the time and date of the verification. It is noted that at no point is an administrator/customer agent required to verify the return of container 200 apart from simply washing and offering container 200 to be used again. Rather, by using the next use of container 200 to verify the previous provisional return of container 200, there is a significant reduction in required time and labor to make sure containers 200 are properly circulating.

Figure 14:
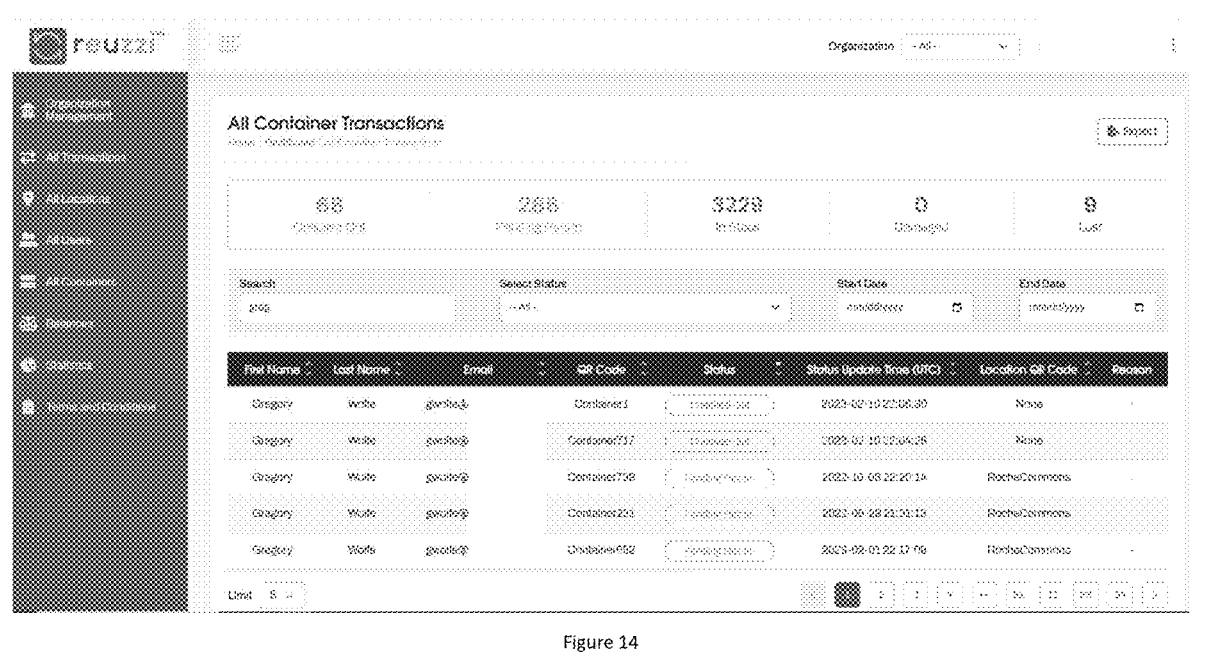

It is noted that account master database 300 as illustrated in FIG. 4 shows a limited amount of data for each container 200/QR code 204 and for all of the related fields 304-318. However, it is understood that as containers 200 are continuously checked out by different users, each of fields 304-308 may not only store the current check-out information for each container 200, but also the historical data for all prior checkouts and returns. FIG. 4 only shows the current/most recent checkouts for simplicity. A customer/administrator may have options to view account master database 300, just viewing the most recent checkout, or viewing an entire history of checkouts for one or multiple containers 200. Other viewing features may be added for the customer/administrator where certain rows of account master database 300 may be viewed in different colors. For example, if a row for a container #1001 is under a verified return status and has a current checkout from the next customer in fields 310/312 then that row may appear one color indicating the container is out, whereas if only provisional return field 316 is populated, but field 318 is blank that row may appear a different color indicating that the container is being washed and being put back into circulation. FIG. 14 shows an exemplary screenshot of an administrator management page, supported for example from data contained in account master database 300. It is understood that more or less level of detail may be applied/viewed in the screenshot shown in FIG. 14.

The above features cover the basic features of the present system and method of managing the use of returnable containers 200. However, additional features may be implemented, such as a reward point system for returning containers 200. For example, if a user returns a container 200 within forty-eight (48) hours after checkout they may receive bonus points (e.g., 15 reward points). If the user returns container 200 after forty-eight (48) hours, they may receive a lesser reward (e.g., 5 points). If the user never returns container 200, this can also be tracked as well, possibly leading to the customer charging the user a replacement fee for the lost container(s) 200. It is contemplated that account master database 300 and the fields therein as described above may be used to track compliance with this reward system.

In one embodiment shown in FIG. 10, the system may also support a rewards database 800 for the customer, that includes user ID field 802 identifying users of the customers reusable containers 200. A total use field 804 may show the total number of times any one user used a container 200, with possible additional data of QR codes 204 etc., depending on the granularity of data desired to be retained by the customer. An outstanding returns field 806 may list the number of unreturned containers 200 checked out by a user. A provisionally returned field 808 may list the number of containers that are considered provisional returned by the user as per the steps of FIG. 8. A verified returned field 810 may list the number of containers that are considered as verified returns by the user as per the steps of FIG. 9. Each of these fields may be cross populated with data from the fields in account master database 300 described above.

As shown in FIG. 10 reward database 800 may also have an accumulated points field 812 that keeps track of earned reward points by each user, such as fifteen (15) points for a timely return and five (5) points for any other return. It is readily understood that such reward points may be flexibly offered by the customer depending on the rewards system they want to offer to users, and how strict they want to be on return times. Finally, rewards database 800 may include a redeemed points field 814 to track how a user redeems their awards points using their application.

Figure 11:
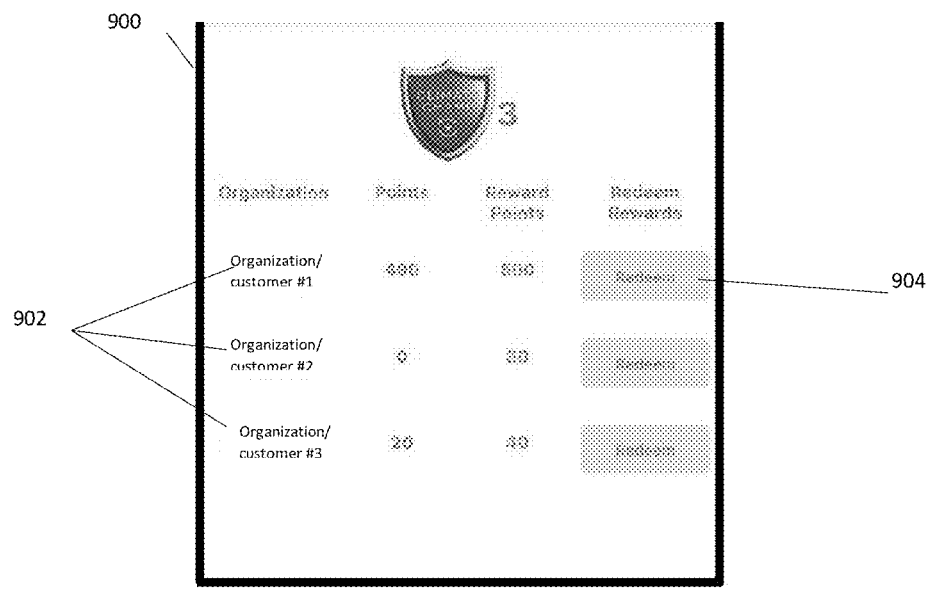
FIG. 11 is a screenshot taken from the user application showing their badges and reward status with a plurality of customer accounts, in accordance with one embodiment.

For example, FIG. 11 is a rewards screenshot 900 from a user's application listing a number of customer accounts 902 from which they may have used reusable containers 200 (i.e., a user may use reusable containers 200 from more than one different customer, each of which offering their own rewards programs). A redeem rewards button 904 would allow a user to apply points stored in points field 802 from one customer account to obtain free food items from the customer, planting a tree, etc. (to be recorded in redeemed awards field 814). Once the Redeem Rewards button 904 is clicked, a live, moving gif lets the customer know that the user has accrued enough points and gives the user time to redeem the reward.

Figure 12:
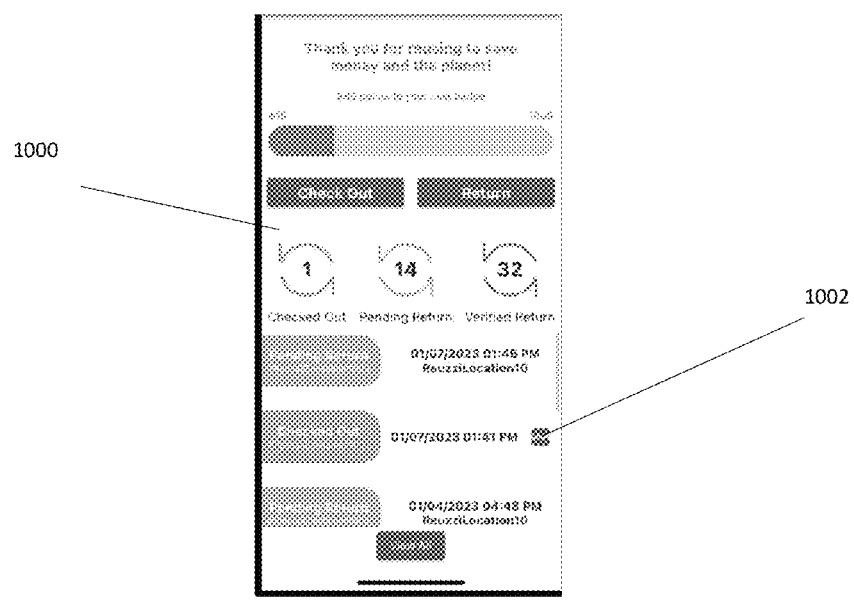
FIG. 12 is screenshot taken from the user application showing the current usage by the user, in accordance with one embodiment.

Other features available to the user on their application may be a general usage tracker screen 1000 shown for example in FIG. 12, showing their number of checked out containers 200, provisionally returned containers 200, and/or verified returned containers 200. This tracker screen 1000 may be subdivided showing usage at various customers/accounts individually or may be combined to show total usage across all customers implementing the present system and method, where the user makes use of reusable containers 200. A user may mark a container 200 damaged or lost by tapping the blue "Charlie Brown shirt" symbol 1002. If container 200 is deemed damaged or lost, it could be retired by the customer administration. Statistics for the user and/or organization may be displayed in the application along with the website, e.g., money saved, $CO_2$ emissions averted, and equivalent trees planted per year (see e.g. the screenshot in FIG. 16 from current website for an organization).

Figure 13:
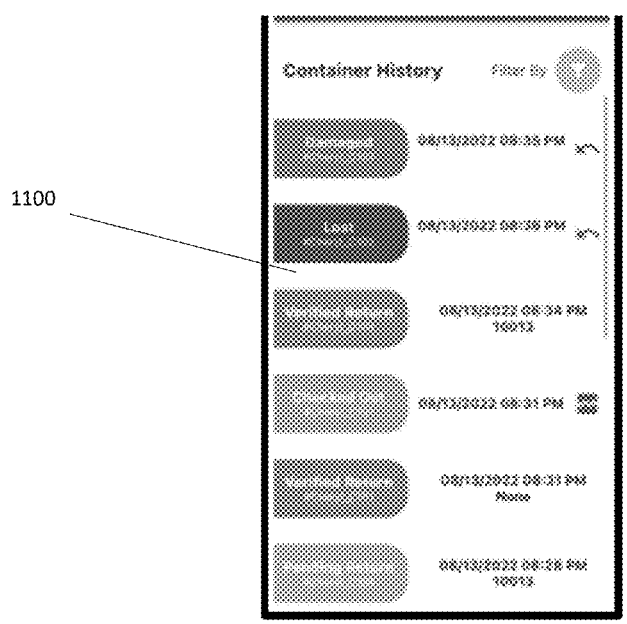
FIG. 13 is a screenshot taken from the user application showing the current usage by the user, in accordance with one embodiment.

FIG. 13 shows another version of a screenshot 1100, similar to FIG. 12 with various container 200 histories for the user.

In another embodiment, pricing to the customer for the present system and method may be based on for example, an ongoing administration fee charged per QR code 204 issued. It is understood that this form of pricing is only by way of basic illustration and that any pricing scheme may be used in conjunction with the initiation and maintenance of the features described herein.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A method comprising:
    receiving, by a computing system, a first communication from a mobile device executing an application of a first one of a plurality of users scanning a label associated with a unique code associated with a first reusable container when checking out the first reusable container to consume a meal/beverage/purchasing a meal;
    updating, by the computing system, a customer account database with a first information relating to said first communication, indicating that said first reusable container is associated with a first user and is checked out to said first one of the plurality of users, wherein the customer account database is populated with a user ID, date, and time of check out of said first reusable container;
    receiving, by the computing system, a second communication from said mobile device of said first one of the plurality of users including information that said first one of the plurality of users scanned unique code on said label of said first reusable container and said first user scanned at least one second location code associated with a return location, indicating that said first reusable container has been returned to said return location;
    updating, by the computing system, a customer account database with a second information relating to the second communication, indicating that said first reusable container have said unique code has been returned to said return location, said second communication constituting a provisional return status to said first one of said users for said first reusable container, wherein the customer account database is populated with user id and the provisional return time and date of the first reusable container;
    after said first reusable container is cleaned and sanitized, it is returned to circulation, receiving, by the computing system, from said mobile device executing the application of a third communication from a second one of the plurality of users indicating that the second one of said users scanning a label associated with first reusable container when checking out the first reusable container to consume a meal/beverage/purchasing a meal;
    in response to receiving the third communication from the second one of the plurality of users, converting, by the computing system, the provisional return status of said first one of said users for said first reusable container to a confirmed return status without user intervention or a user manually adjusting the customer account database;
    in response to the confirming return status, comparing, by the computing system, a first time associated with the first information to a second time associated with the second information; and
    determining, by the computing system, a level of reward based on a difference between the first time and second time to a predetermined time within a timer field.

2. The method as claimed in claim 1, wherein said unique code associated with a first reusable container is a QR code.

3. The method as claimed in claim 1, wherein said first reusable container is a recyclable plastic food containers.

4. The method as claimed in claim 1, wherein said application executing on said mobile device is further configured to display a first color indicating, said first one of said users has not scanned said unique code, wherein after said first one of said users scans said unique code on said first reusable container said application switches to a second display of a second color.

5. The method as claimed in claim 1, wherein said application executing on said mobile device is further configured to switch to the display of a third color after said first one of said users scans said unique code on said first reusable container, and when said first one of said users has other unreturned reusable containers checked out.

6. A system comprising:
    a computing system comprising at least one processor configured to receive a first communication from a mobile device executing an application of a first one of a plurality of users scanning a label associated with a unique code associated with a first reusable container when checking out the first reusable container to consume a meal/beverage/purchasing a meal;
    said computing system updating a customer account database with a first information relating to said first communication, indicating that said first reusable container is associated with a first user and is checked out to said first one of the plurality of users, wherein the customer account database is populated with a user ID, date, and time of check out of said first reusable container;
    said computing system comprising at least one processor further configured to receive a second communication from said mobile device of said first one of the plurality of users including information that said first one of the plurality of users scanned unique code on said label of said first reusable container and said first user scanned at least one second location code associated with a return location, indicating that said first reusable container has been returned to said return location;
    said computing system updating a customer account database with a second information relating to the second communication, indicating that said first reusable container have said unique code has been returned to said return location, said second communication constituting a provisional return status to said first one of said users for said first reusable container, wherein the customer account database is populated with user id and the provisional return time and date of the first reusable container;
    after said first reusable container is cleaned and sanitized, it is returned to circulation, said computing system comprising at least one processor is configured to receive from said mobile device executing the application of a third communication from a second one of the plurality of users indicating that the second one of said users scanning a label associated with first reusable container when checking out the first reusable container to consume a meal/beverage/purchasing a meal;

in response to receiving the third communication from the second one of the plurality of users, said computing system comprising at least one processor is configured to convert the provisional return status of said first one of said users for said first reusable container to a confirmed return status without user intervention or a user manually adjusting the customer account database;

in response to the confirming return status, said computing system comprising at least one processor is configured to compare a first time associated with the first information to a second time associated with the second information; and said computing system comprising at least one processor is configured to determine a level of reward based on a difference between the first time and second time to a predetermined time within a timer field.

7. The system as claimed in claim 6, wherein said unique code associated with a first reusable container is a QR code.

8. The system as claimed in claim 6, wherein said first reusable container is a recyclable plastic food containers.

9. The system as claimed in claim 6, wherein said application executing on said mobile device is further configured to display a first color indicating, said first one of said users has not scanned said unique code, wherein after said first one of said users scans said unique code on said first reusable container said application switches to a second display of a second color.

10. The system as claimed in claim 9, wherein said application executing on said mobile device is further configured to switch to the display of a third color after said first one of said users scans said unique code on said first reusable container, and when said first one of said users has other unreturned reusable containers checked out.

* * * * *